(12) United States Patent
Senn et al.

(10) Patent No.: US 10,807,210 B2
(45) Date of Patent: Oct. 20, 2020

(54) CLAMPING SYSTEM

(71) Applicant: Rego-Fix AG, Tenniken (CH)

(72) Inventors: Tobias Senn, Diegten (CH); Konrad Abt, Reigoldswil (CH)

(73) Assignee: Rego-Fix AG, Tenniken (CH)

( * ) Notice: Subject to any disclaimer, the term of this patent is extended or adjusted under 35 U.S.C. 154(b) by 90 days.

(21) Appl. No.: 16/307,556

(22) PCT Filed: Jun. 1, 2017

(86) PCT No.: PCT/EP2017/063295
§ 371 (c)(1),
(2) Date: Dec. 6, 2018

(87) PCT Pub. No.: WO2017/211676
PCT Pub. Date: Dec. 14, 2017

(65) Prior Publication Data
US 2019/0299351 A1    Oct. 3, 2019

(30) Foreign Application Priority Data
Jun. 7, 2016    (CH) .................................. 0725/16

(51) Int. Cl.
*B23Q 17/00*    (2006.01)
*B23B 31/20*    (2006.01)
*G01L 5/00*    (2006.01)

(52) U.S. Cl.
CPC ............ *B23Q 17/005* (2013.01); *B23B 31/20* (2013.01); *G01L 5/0042* (2013.01); *B23B 2260/078* (2013.01)

(58) Field of Classification Search
CPC ... B23Q 17/005; B23Q 17/002; G01L 5/0042; G01L 5/24; B23B 31/20; B23B 2260/078
See application file for complete search history.

(56) References Cited

U.S. PATENT DOCUMENTS

| | | | | |
|---|---|---|---|---|
| 2,030,464 A | * | 2/1936 | Nilson ................. | G01L 5/0042 73/761 |
| 2,281,226 A | * | 4/1942 | Younse ................. | B23P 19/065 73/862.25 |
| 3,088,313 A | * | 5/1963 | Berg ....................... | G01L 5/24 73/761 |
| 4,664,571 A | * | 5/1987 | Takada ................. | B23Q 17/005 409/134 |
| 4,856,349 A | * | 8/1989 | Huser ................... | B23B 31/261 73/862.541 |
| 4,989,459 A | * | 2/1991 | Faber, Jr. .............. | G01L 5/0042 73/847 |
| 5,109,706 A | * | 5/1992 | Mogilnicki .............. | G01L 5/24 29/721 |

(Continued)

FOREIGN PATENT DOCUMENTS

| | | | |
|---|---|---|---|
| DE | 3937466 A1 * | 5/1991 | ....... B23B 31/16258 |
| DE | 10 2009 054185 B3 | 4/2011 | |

(Continued)

*Primary Examiner* — Eric A. Gates
(74) *Attorney, Agent, or Firm* — Hammer & Associates, P.C.

(57) ABSTRACT

A clamping device for clamping a tool includes a tool holder with a collet and a clamping nut in and the tool holder has a mechanism for clamping the tool holder and for detecting and displaying a torque applied to the clamping nut.

2 Claims, 2 Drawing Sheets

(56) References Cited

U.S. PATENT DOCUMENTS

| | | | |
|---|---|---|---|
| 5,382,213 A | 1/1995 | Kopel et al. | |
| 5,597,964 A * | 1/1997 | Binns | G01L 5/0042 73/761 |
| 8,453,519 B2 * | 6/2013 | Zhang | G01L 5/0042 73/862.08 |
| 8,739,661 B2 * | 6/2014 | Haimer | B23B 31/20 81/467 |
| 8,910,526 B2 * | 12/2014 | Carlsson | G01L 3/102 73/761 |
| 9,205,524 B2 * | 12/2015 | Stoneback | B23Q 17/005 |
| 9,527,185 B2 * | 12/2016 | Stoneback | B23Q 17/003 |
| 9,696,224 B1 * | 7/2017 | Tsai | G01L 3/00 |
| 9,702,797 B2 * | 7/2017 | Yang | G01N 3/22 |
| 9,915,574 B2 * | 3/2018 | George | G01L 5/243 |
| 10,345,172 B1 * | 7/2019 | Seok | G01L 5/24 |
| 2010/0013171 A1 | 1/2010 | Haimer et al. | |
| 2014/0367929 A1 * | 12/2014 | Fahrion | B23B 31/20 279/42 |
| 2020/0003642 A1 * | 1/2020 | Ivenz | H04Q 9/02 |

FOREIGN PATENT DOCUMENTS

| | | | |
|---|---|---|---|
| DE | 102017114536 B3 * | 7/2018 | ........... B23B 31/305 |
| FR | 3074074 A1 * | 5/2019 | ......... B23K 26/1224 |
| JP | H01 121181 A | 5/1989 | |
| SE | 200100981 A * | 3/2002 | |
| SE | 200600020 A * | 12/2006 | |

\* cited by examiner

CLAMPING SYSTEM

The invention relates to a clamping system. In clamping a tool in a tool holder by means of a collet, a conical collet is pressed with a clamping nut into a receiver cone, causing segments of the collet to be pressed against the tool shaft. In this way the tool is held in a nonpositive locking manner.

The axial force with which the collet is pressed depends directly on the torque which is applied to the clamping nut. This torque should be kept within a narrow range. If the torque is too low, the nonpositive lock between the collet and tool will be too small, so that the tool may slip. When the torque is too great, the clamping nut and the tool receiver may be damaged. In addition, there may be deformation of the clamping nut and the tool receiver, which can impair the concentricity of the tool. Clamping should therefore be carried out with a torque wrench. However, in practice, this is not frequently done. Frequently, in the absence of a suitable torque wrench, the greatest possible torque is applied (hammer!) with a normal wrench, with consequences as described.

The object of the invention is to find a solution to this problem and to ensure that the tool is tightened with the correct torque.

According to the invention, this object is achieved by the distinguishing features of claimed clamping system.

Below an exemplary embodiment of the invention is described with reference to the attached drawings. Wherein.

Figure 1:
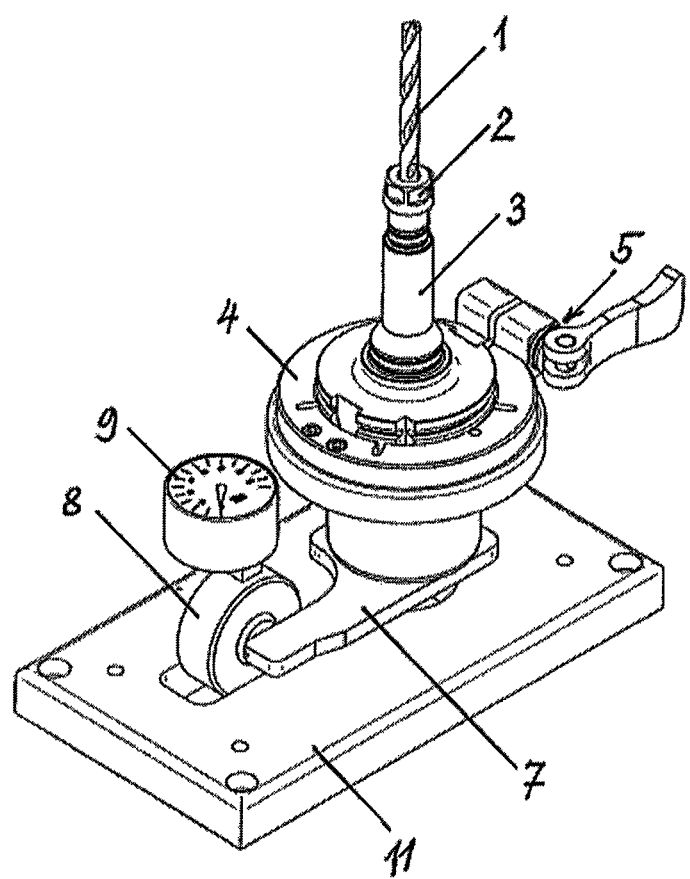
FIG. 1 shows a perspective representation of a clamping device.
Figure 2:
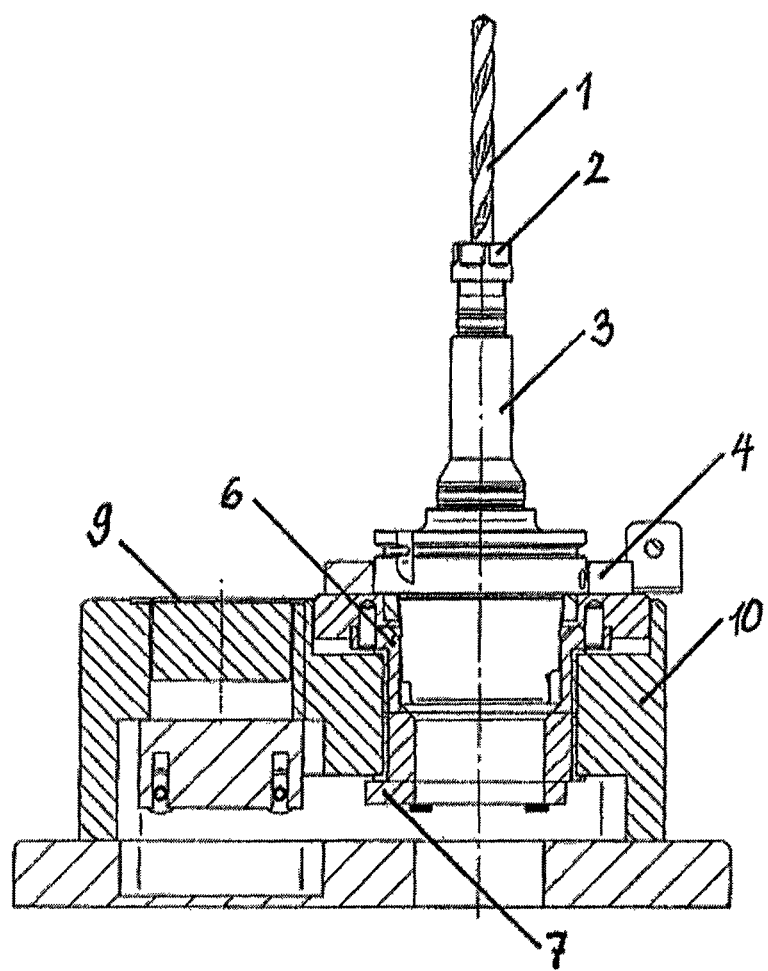
FIG. 2 shows a cross-sectional representation of the device shown in FIG. 1.

The device shown in FIG. 1 in perspective and in FIG. 2 in cross-section serves for clamping a tool 1 by means of a clamping nut 2 and a collet (not shown) in a tool holder 3. FIG. 1 shows the device without housing for the sake of clarity.

A clamping ring 4 has a diameter corresponding to the outside diameter of the tool holder flange and is provided with a quick-release mechanism 5 for quick clamping and release of the tool holder. The clamping ring 4 is rigidly connected by a cylindrical sleeve 6 to a lever 7. The end of the lever lies against a pressure cell 8 which is hydraulically connected to a display device 9. The display device is accordingly calibrated to the torque applied to the clamping nut. The functional parts of the device are arranged in the housing 10, which is connected to a base plate 11.

Using the device according to the invention, the tightening of the clamping nut can be carried out with any optional tool. A torque wrench is not required. For a tool holder clamped into the clamping ring by means of a quick-release mechanism, when a torque is applied to the clamping nut, this acts via the clamping ring 4 and the sleeve 6 directly on the lever 7, which then presses, on the pressure cell with a force corresponding to the torque. The pressure thereby arising in the pressure cell is hydraulically transmitted to the display device and displayed as torque. Instead of the pressure cell, some other pressure measurement unit can also be used, for example a piezoelectric sensor.

The clamping ring is interchangeable for adjustment of the device to different flange diameters of the tool holder.

The invention claimed is:

1. A clamping device for clamping a tool using a covet and clamping nut into a tool holder comprises:
    a clamping ring for clamping the too holder,
    a lever which is rigidly connected to the clamping ring,
    a pressure cell, against which the lever lies and to which a force is transmitted via a torque exerted on the clamping nut, and
    a display device connected to the pressure cell and calibrated according to an exerted torque,
    whereby clamping does not require a torque wrench.

2. The clamping device according to claim 1, wherein the clamping ring has a quick-release mechanism.

* * * * *